United States Patent [19]

Koike et al.

[11] Patent Number: 4,632,703
[45] Date of Patent: Dec. 30, 1986

[54] RECORDING LIQUID

[75] Inventors: Shoji Koike, Yokohama; Tsuyoshi Eida, Ichikawa; Masatsune Kobayashi; Yasumasa Yokoyama, both of Yokohama; Tomoko Komori, Tokyo, all of Japan

[73] Assignee: Canon Kabushiki Kaisha, Tokyo, Japan

[21] Appl. No.: 592,546

[22] Filed: Mar. 23, 1984

[30] Foreign Application Priority Data

Mar. 29, 1983 [JP] Japan ................................ 58-51389

[51] Int. Cl.$^4$ ............................................. C09D 11/02
[52] U.S. Cl. ........................................ 106/22; 106/23
[58] Field of Search ............................. 106/20, 22, 23; 260/245.77, 245.78, 245.79

[56] References Cited

U.S. PATENT DOCUMENTS 4,446,470  5/1984  Sugiyama et al. ..................... 106/22

FOREIGN PATENT DOCUMENTS 917780  2/1963  United Kingdom .

Primary Examiner—Amelia B. Yarbrough
Attorney, Agent, or Firm—Fitzpatrick, Cella, Harper & Scinto

[57] ABSTRACT

A recording liquid comprises a recording agent, water and a water-soluble organic solvent as essential components, wherein said recording agent comprises at least one of the dyes represented by the formula (A) shown below:

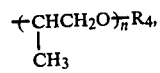

(wherein [Ph] represents a phthalocyanine skeleton at the center of which a metal atom may be coordinated, X represents an alkali metal or $NH_4$, a and b each independently represent an integer of 1 to 3 satisfying the relation of $2 \leq a+b \leq 4$, Q represents a group $-SO_2OR_1$ or a group $-SO_2NR_2R_3$, where $R_1$ represents an alkyl or an alicyclic group having not more than 15 carbon atoms which may be branched or an aralkyl group having not more than 15 carbon atoms, $R_2$ and $R_3$ each independently represent a group $-(CH_2CH_2O)_nR_4$, a group $-(CH_2CHOH)_nR_4$, a group $$-(\underset{\underset{CH_3}{|}}{C}HCH_2O)_{\overline{n}}R_4,$$

a straight or cyclic alkyl group having not more than 15 carbon atoms which may be branched or an aralkyl group having not more than 15 carbon atoms or an amino acid salt radical, n means an integer of 0 to 12, and $R_4$ means H, $CH_3$ or $CH_2OH$).

20 Claims, No Drawings

RECORDING LIQUID

BACKGROUND OF THE INVENTION

1. Field of the Invention

This invention relates to a recording liquid suitable for use in the ink jet system in which recording is performed by permitting liquid droplets to fly through orifices of a recording head or for use in writing tools.

2. Description of the Prior Art

Various types of ink jet recording methods have been actively investigated, because they generate less noise, require no special fixing for recording on a plain paper and also enable high speed recording. The recording liquid to be used in these ink jet recording methods is required to have various characteristics, including property values such as viscosity and surface tension within appropriate ranges, no clogging of a minute discharging outlet (orifice), capability of giving recorded images of clear tone and sufficiently high density, and stability of physical properties or no solid precipitation during storage. In addition to these characteristics, it is also required to have other properties such that recording should be possible without limitation of the materials to be recorded on (hereinafter referred to as recording materials) as represented by paper, that the fixing speed on recording materials should be great, that it should be excellent in water resistance, solvent resistance (particularly alcohol resistance), light resistance and abrasion resistance and also that it can give images excellent in resolution.

The recording liquid to be used for the ink jet recording method is basically composed of a dye as the recording agent and a solvent, and hence the characteristics of the recording liquid are greatly governed by the inherent properties of the dye. Accordingly, it is a very important technique in such a field of the art to select a dye so that the recording liquid may have the characteristics as mentioned above.

In particular, solubility of the recording agent in a liquid medium is important. Namely a sufficient solubility in water as well as in a wetting agent generally composed of an organic solvent is essential for maintaining good anti-clogging property and good solving stability of the recording agent.

On the other hand, in recording a full color image according to the ink jet recording method, three recording liquids of the primary colors of magenta, yellow and cyan, respectively, or four recording liquids of the three primary colors plus black are used, and the tone of the recorded image is given by subtractive mixing of those colors. In this case, in order to obtain a desired tone of the image recorded, the recording liquids are required to have hues exhibiting ideal magenta, yellow or cyan primary color, respectively, and also high chromas. Thus, it is a very important technique to select a dye in consideration of the tone given by the recording liquid.

However, among the recording liquids of cyan color known in the art, particularly the ones containing phthalocyanine type dyes as the recording agent, there were few recording liquids satisfying sufficiently the requirement for the characteristics as mentioned above, particularly the solubility and the tone, and the development of a recording liquid having these characteristics has long been desired.

For example, in the case of a recording liquid containing copper phthalocycnine tetrasolfonic acid or its alkali metal or organic amine salt as the recording agents disclosed in Japanese Laid-open Patent Publication No. 5772/1982, this dye, having 4 sulfonate substituents, is highly soluble in water. However, the following problem has been pointed out: when the recording liquid is left unused in a recording device for a long term, the composition of the recording liquid at the nozzle portion changes due to the evaporation of water which is a more volatile component of the recording liquid, and this change tends to clog the nozzle portion because of the low solubility of the dye in polyhydric alcohols conventionally added thereto as a wetting agent.

SUMMARY OF THE INVENTION

An object of the present invention is to provide a recording liquid for ink jet recording or for writing tools such as stationery, in which the recording agent has an excellent solubility in a liquid medium containing water and a water-soluble organic solvent and has high solution stability over a long term.

Another object of the present invention is to provide a recording liquid of cyan color for ink jet recording of full color, which can produce an ideal cyan color and is less liable to cause clogging at the discharging orifice.

According to the present invention, there is provided a recording liquid comprising a recording agent, water and a water-soluble organic solvent as essential components, wherein said recording agent comprises at least one of the dyes represented by the formula (A) shown below:

(wherein [Ph] represents a phthalocyanine skeleton at the center of which a metal atom may be coordinated, X represents an lakali metal or NH$_4$, a and b each independently represent in integer of 1 to 3 satisfying the relation of $2 \leq a+b \leq 4$, Q represents a group —SO$_2$OR$_1$ or a group —SO$_2$NR$_2$R$_3$, where R$_1$ represents an alkyl or an alicyclic group having not more than 15 carbon atoms which may be branched or an aralkyl group having not more than 15 carbon atoms, R$_2$ and R$_3$ each independently represent a group —CH$_2$CH$_2$O)$_n$R$_4$, a group —CH$_2$CHOH)$_n$R$_4$, a group

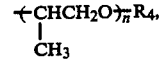

a straight or cyclic alkyl group having not more than 15 carbon atoms which may have a branched chain or an aralkyl group having not more than 15 carbon atoms or an amino acid salt radical, n means an integer of 0 to 12, and R$_4$ means H, CH$_3$ or CH$_2$OH).

DESCRIPTION OF THE PREFERRED EMBODIMENT

In the compounds represented by the above formula (A), the phthalocyanine skeleton [Ph] may be either a phthalocyanine having a metal atom such as Cu, Fe, Co, Ni, Mg, Sn or Mn coordinated at its center or the ones not having a metal coordinated. X in the formula may include an alkali metal such as Na, K, Li etc. and NH$_4$. a and b each independently represent an integer of 1 to 3, and they preferably satisfy the relation of $3 \leq a+b \leq 4$, more preferably $a+b=4$. Q represents a sulfonic acid ester derivative group $—SO_2OR_1$ or a sulfonic acid amide derivative group $—SO_2NR_2R_3$. $R_1$ is a normal alkyl group such as methyl, ethyl or n-butyl, a branched alkyl group such as isopropyl, tert-butyl or 2-pentyl, an alicyclic group such as cyclopentyl or cyclohexyl, or an aralkyl group such as benzyl or phenethyl, and it may preferably have carbon atoms of 12 or less. $R_2$ and $R_3$ represent the same groups as represented by the above $R_1$, and additionally a group $—CH_2CH_2O)_nR_4$, a group $—CH_2CHOH)_nR_4$, a group

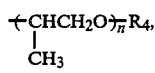

or an amino acid salt radical, where n means an integer of 0 to 12 and $R_4$ means H, $CH_3$ or $CH_2OH$. Examples of suitable amino acid salt radical are alkali metal or ammonium salts of monoamino-monocarboxylic acids such as valine, alanine and the like; oxyamino acids such as serine and the like; sulfur containing amino acids such as cysteine and the like; monoamino-dicarboxylic acids such as aspartic acid, glutamic acid and the like; diamino monocarboxylic acids such as lysine and the like; aliphatic amino acids such as γ-aminobutyric acid and the like; amino acids having benzene ring such as phenylalanine and the like; amino acids having heterocyclic ring such as hystidine, proline and the like.

The compounds represented by the above formula (A) to be contained in the recording liquid of the present invention have not only an $SO_3X$ group as the hydrophilic group but also a Q group having a strong affinity to a high boiling water-soluble organic solvent that serves as a powerful wetting agent, as exemplified by polyhydric alcohols such as diethylene glycol and the like or lower alkyl ethers of polyhydric alcohols such as diethylene glycol methyl ether and the like. Accordingly, the compounds are highly soluble not only in water, but also in the above-mentioned water-soluble organic solvent. Therefore, even after a long standing in contact with the air and evaporation of a considerable amount of the water from the recording liquid, the recording agent will not tend to form a precipitate. Accordingly, when the recording liquid is employed in the ink jet recording method, no substantial clogging of the minute orifices will be caused.

Specific examples of the dyes represented by the above formula (A) may include the dyes of No. 1 to No. 30 as set forth below.

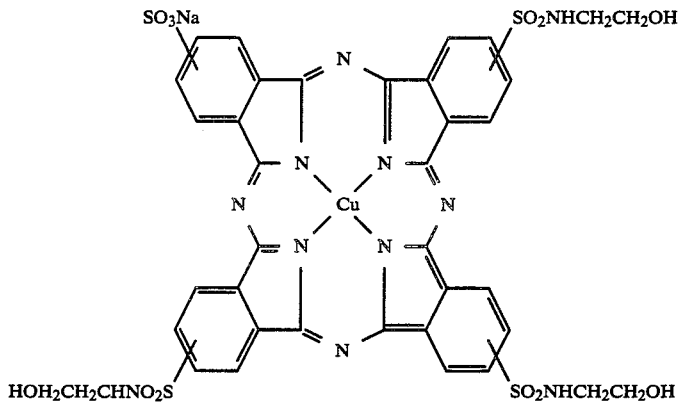

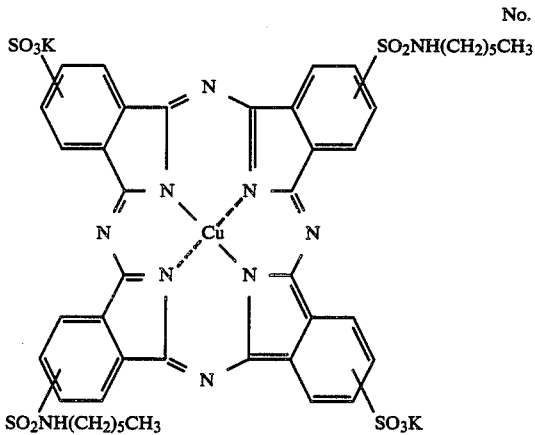

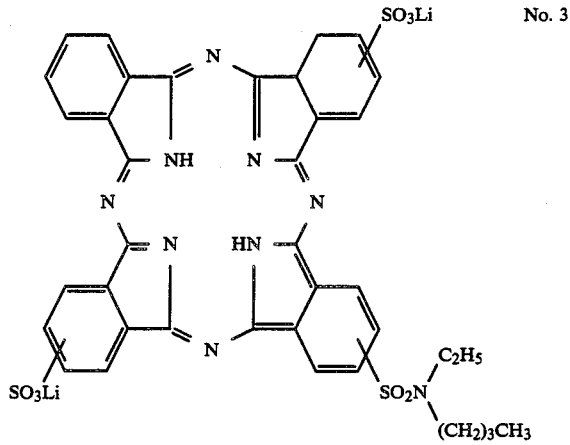

-continued
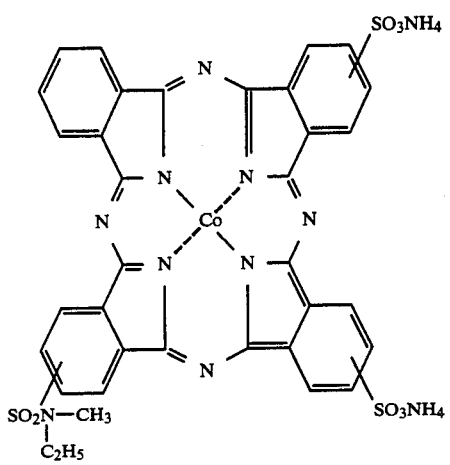 No. 4
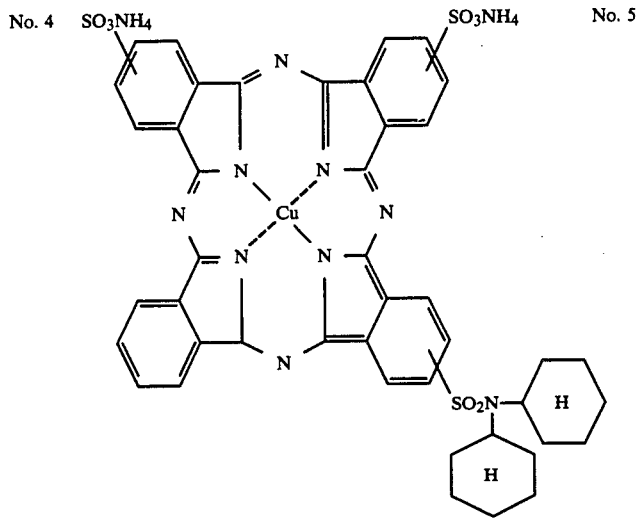 No. 5
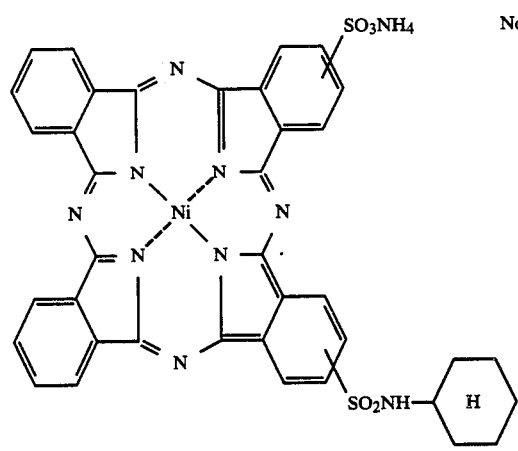 No. 6
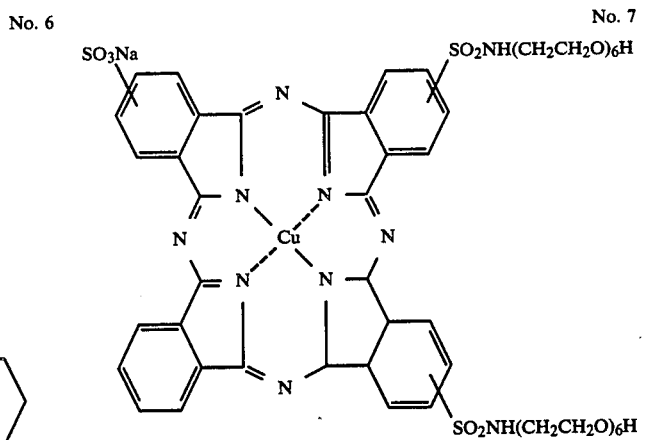 No. 7
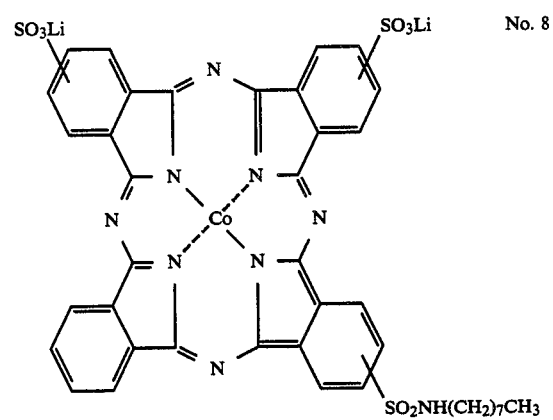 No. 8
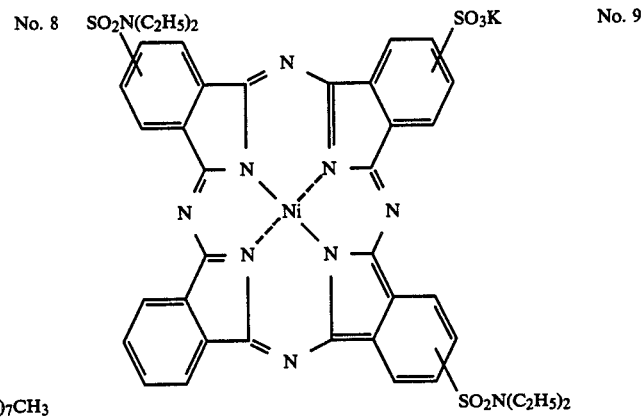 No. 9

-continued
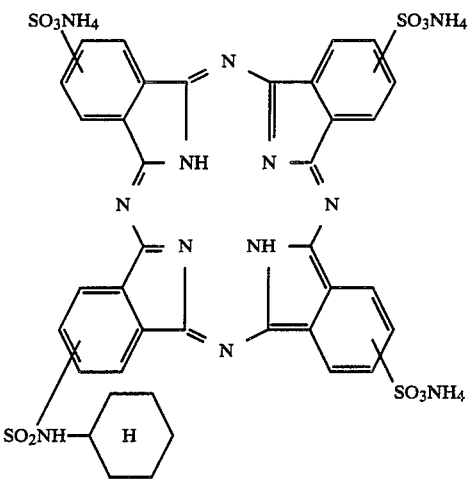 No. 10
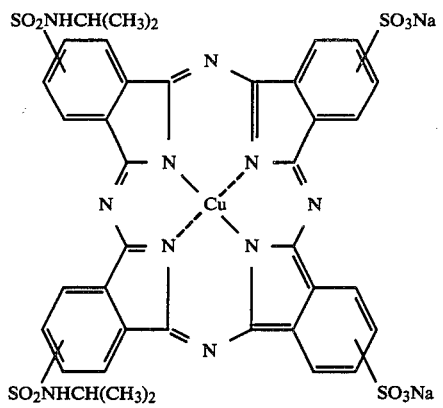 No. 11
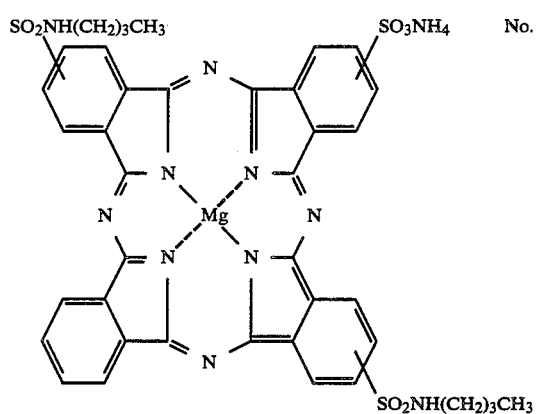 No. 12
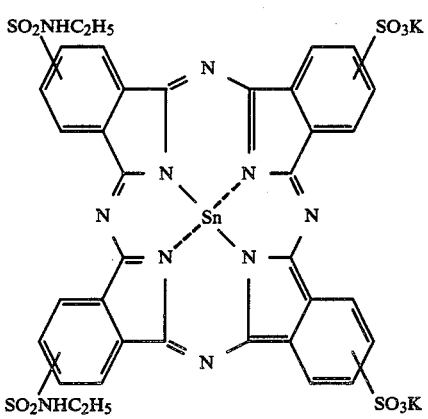 No. 13
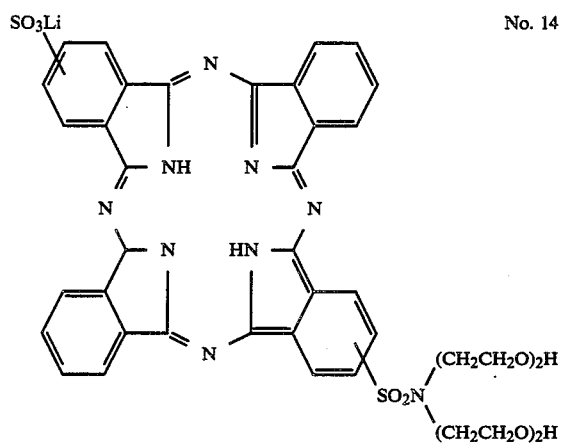 No. 14
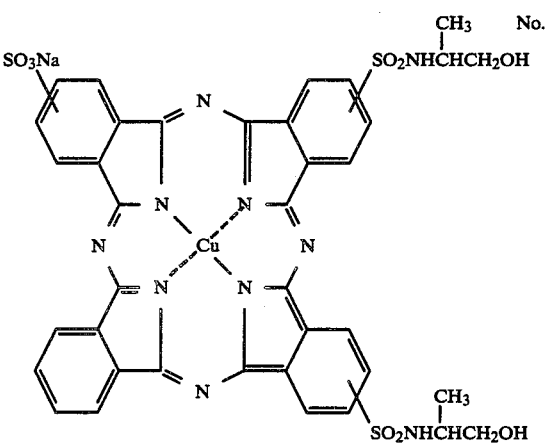 No. 15

-continued
No. 16
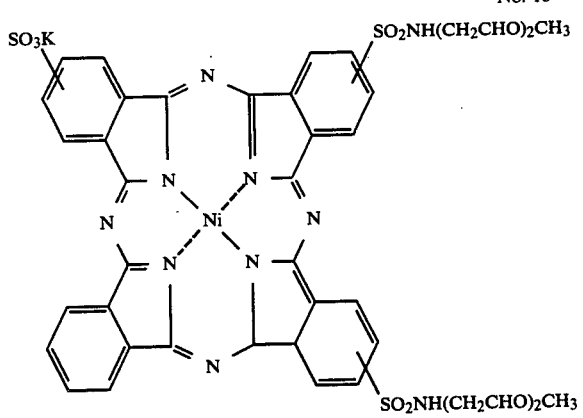
No. 17
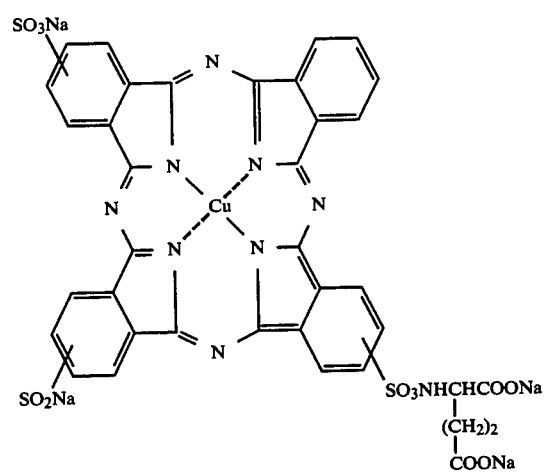
No. 18
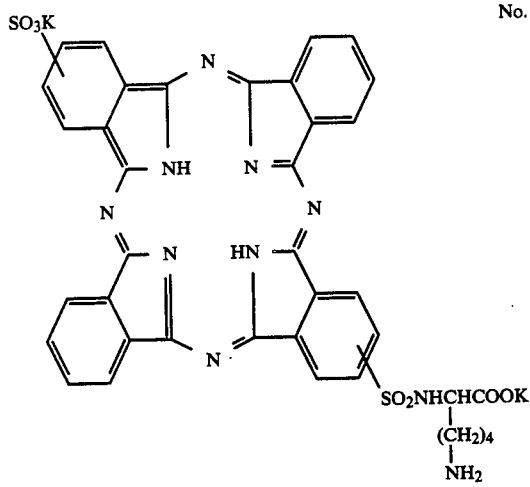
No. 19
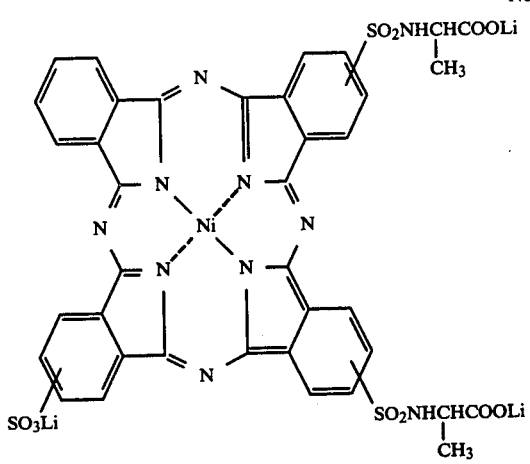
No. 20
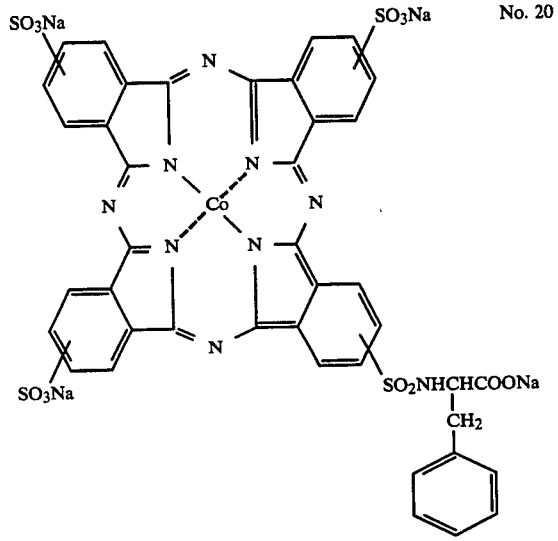
No. 21
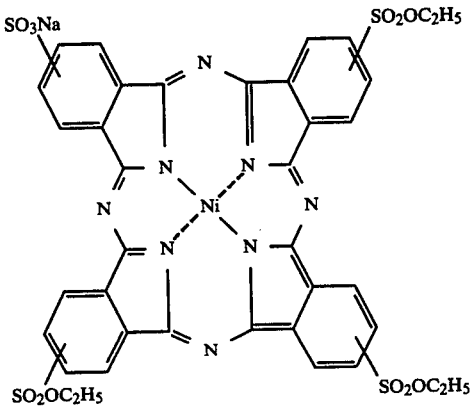

-continued
No. 22 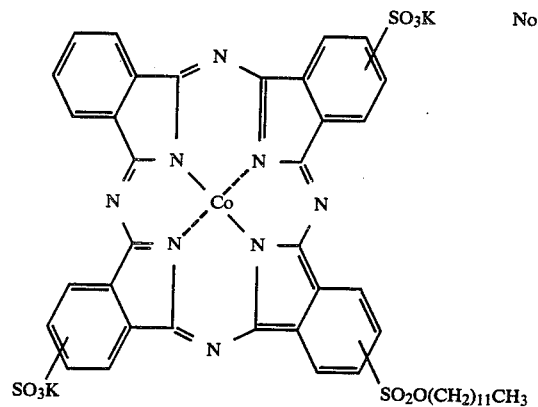 No. 23 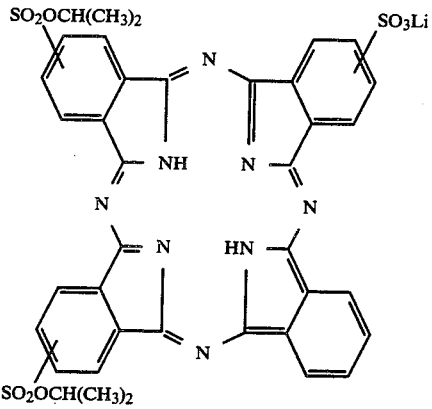
No. 24 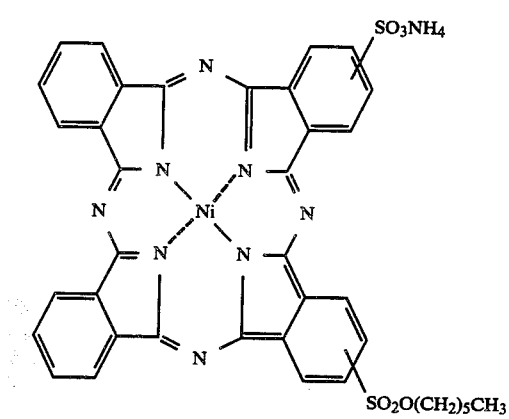 No. 25 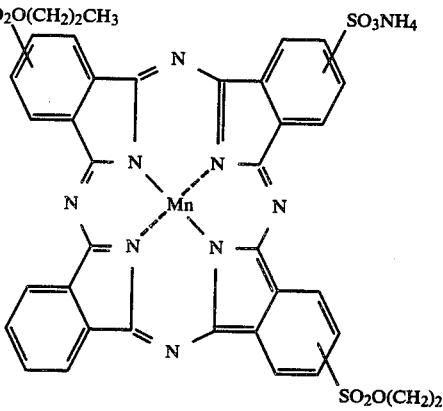
No. 26 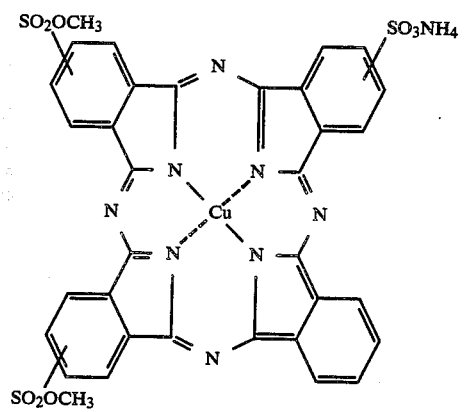 No. 27 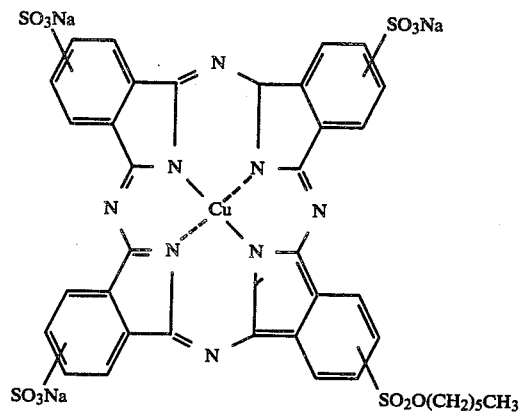
No. 28 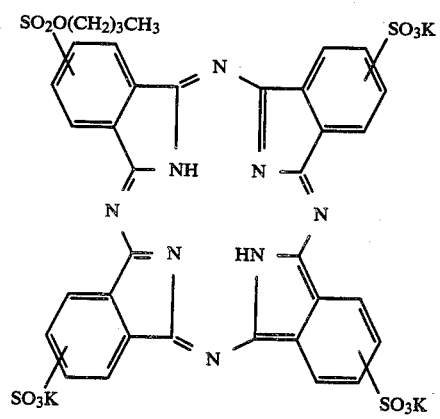 No. 29 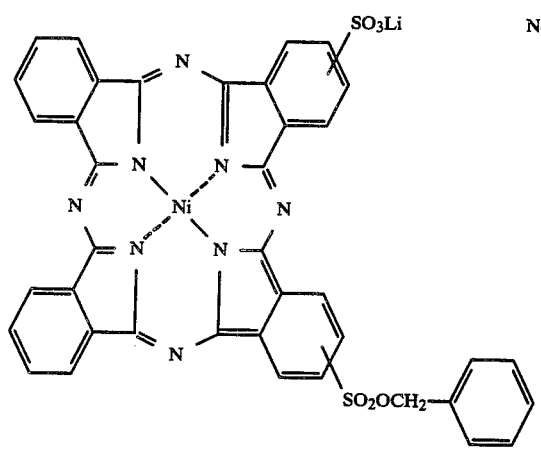

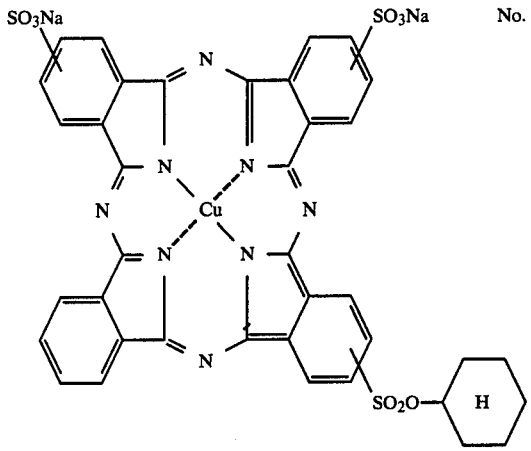

No. 30

-continued

In the recording liquid of the present invention, the dye is contained at a concentration of 0.5 to 20% by weight, preferably 0.5 to 15% by weight, more preferably 1 to 10% by weight. Said dye may be used either singly, or in combination of two or more, or as a combination of said dyes as the essential component with other various dyes such as direct dyes, acid dyes, etc.

The recording liquid of the present invention contains water and a water-soluble organic solvent as the liquid medium for the recording agent.

Examples of water-soluble organic solvents include alkyl alcohols having 1 to 4 carbon atoms such as methyl alcohol, ethyl alcohol, n-propyl alcohol, isopropyl alcohol, n-butyl alcohol, sec-bytyl alcohol, tert-butyl alcohol, isobutyl alcohol and the like; amides such as dimethylformamide, dimethylacetamide and the like; ketones or ketoalcohols such as acetone, diacetone alcohol and the like; ethers such as tetrahydrofuran, dioxane and the like; polyalkylene glycols such as polyethylene glycol, polypropylene glycol and the like; alkylene glycols containing 2 to 6 carbon atoms such as ethylene glycol, propylene glycol, butylene glycol, triethylene glycol, 1,2,6-hexane triol, thiodiglycol, hexylene glycol, diethylene glycol and the like; glycerine; lower alkyl ethers of polyhydric alcohols such as ethylene glycol methyl ether, diethylene glycol methyl (or ethyl) ether, triethylene glycol monomethyl (or ethyl) ether and the like; nitrogen containing heterocyclic ketones such as N-methyl-2-pyrrolidone, 1,3-dimethyl-2-imidazolidinone and the like.

Among these water-soluble organic solvents, preferable are polyhydric alcohols such as diethylene glycol, lower alkyl ethers of polyhydric alcohols such as triethylene glycol monomethyl (or monoethyl) ether, and nitrogen-containing heterocyclic ketones such as N-methyl-2-pyrrolidone. Polyhydric alcohols are particularly preferred because of their strong action as the wetting agent for prevention of clogging of the nozzle caused by precipitation of the recording agent resulting from evaporation of water from the recording liquid.

The content of the above water-soluble organic solvent in the recording liquid may be within the range of from 5 to 95%, preferably from 10 to 80%, and more preferably from 20 to 50% by weight based on the total weight of the recording liquid.

On the other hand, the water content, which may be determined in a wide range depending on the kind of the above solvent component, its composition, or the characteristics desired for the recording liquid, may be generally from 10 to 90%, preferably from 10 to 70% by weight based on the total weight of the recording liquid.

The recording liquid prepared from the components of the present invention for writing tool or the recording liquid for the so-called ink jet recording is in itself well balanced in characteristics such as recording characteristics (signal response, stable formation of droplets, stable discharging, continuous recording ability for a long time, stable discharging after recording intermission for a long time), storage stability, solution stability of the recording agent, good fixing onto the recording member, and light resistance, weathering resistance, water resistance or alcohol resistance of the recorded images. For further improvement of such characteristics, various additives known in the art may be incorporated in the recording liquid.

The additives may include, for example, viscosity controlling agents such as polyvinyl alcohol, celluloses, and water-soluble resins; various surfactants such as cationic, anionic and nonionic surfactants; surface tension controlling agents such as diethanolamine, triethanolamine, etc.; pH controlling agents with the use of buffering agents; and others.

For preparing a recording liquid to be used for the recording method of the type in which the recording liquid is electrically charged, there may be employed agents for controlling specific resistance such as inorganic salts, including lithium chloride, ammonium chloride, sodium chloride and the like. Also, as a water retention improver at the tip of the discharging orifice, urea and thiourea may be preferably used. In the recording of the type in which the recording liquid is discharged by the action of heat, thermal physical properties (e.g. specific heat, coefficient of thermal expansion, thermal conductivity, etc.) may sometimes be adjusted.

The recording liquid of the present invention has particularly excellent characteristics as the recording liquid for ink jet recording, but of course it can be used for usual writing tools such as fountain pens, felt pens, etc. which perform recording on a recording material such as paper.

The present invention is described in more detail by referring to the following Synthesis examples and Examples.

SYNTHESIS EXAMPLE 1

Synthesis of Dye No. 1:

Into a 2-liter three-necked flask equipped with a thermometer and a condenser, 600 g of chlorosulfonic acid was charged and 100 g of copper phthalocyanine was gradually added thereto with stirring under cooling. Then, the temperature was raised to 140° to 145° C., and stirring was continued for 3 hours. Although thionyl chloride is added in obtaining copper phthalocyanine-tetra-4-sulfonylchloride, no thionyl chloride was added in the Example in order to have free —$SO_3H$ groups partially contained in the reaction product. The resulting reaction mixture was cooled to 20° C., and then poured into a beaker containing 2 Kg of ice and 600 g of water. The precipitates formed were separated by filtration with a qualitative filter paper, and the filter cake was washed with cold water of 5° C. or lower until the washing became substantially neutral.

The paste-like produce of the copper phthalocyanine derivative thus prepared was dispersed in a beaker containing 1 Kg of ice and 600 g of water, then 52 g of monoethanolamine was added thereto, and further the pH was adjusted to 8-9 with 1N aqueous sodium carbonate solution, followed by stirring for 10 hours. Then the mixture was gradually heated up to 50° C. in one hour, and 1N aqueous sodium carbonate solution was added thereat need to keep the pH value at 8-9. The reaction was regarded as being completed when pH was no longer lowered. The mixture was again separated by filtration with a qualitative filter paper, and the filtered paste was washed with a dilute aqueous sodium carbonate solution of pH about 9.5, followed by drying, to obtain 130 g of the reaction product.

SYNTHESIS EXAMPLE 2

Synthesis of Dye No. 21:

According to the same procedure as in Synthesis example 1, except for using the same quantity of nickel phthalocyanine in place of copper phthalocyanine, 120 g of a chlorosulfonated derivative paste of nickel phthalocyanine containing partially free —$SO_3H$ groups was obtained. Next, the paste-like produce was dissolved in a mixture of 200 g of absolute ethanol and 150 g of ethyl ether, and while the mixture was maintained at 20° C. under stirring, a solution of 150 g of sodium ethoxide dissolved in ethanol was gradually added dropwise thereto. The mixed solution was allowed to stand until it was shown not to be alkaline. Then, the ether was evaporated off under reduced pressure and the residue was poured into one liter of water, followed by extraction with chloroform. To the extract was added a 10% aqueous sodium hydrogen carbonate solution and the mixture was subjected to shaking. Then, the chloroform layer was separated into a beaker, to which 50 g of sodium sulfate was added and the mixture was left to stand overnight for dehydration.

The solution was filtered and chloroform was evaporated under reduced pressure to obtain 120 g of the reaction product.

EXAMPLE 1

Using Dye No. 1 prepared in the above Synthesis example 1, a recording liquid having the following composition was prepared.

| Composition I | |
|---|---|
| Deionized water (hereinafter referred simply to as water) | 50 parts by weight |
| Diethylene glycol | 46 parts by weight |
| Dye No. 1 | 4 parts by weight |

The above ingredients were thoroughly mixed and dissolved in a vessel, filtered under pressure through a Teflon filter with a pore size of 1$\mu$ and then subjected to the degassing treatment with a vacuum pump to provide a recording liquid.

For this recording liquid, solution stability test and ink jet recording test were conducted. The results are shown in Table 1. The respective tests for evaluation of the recording liquid were conducted according to the procedure described below.

[Solution stability test]

After the stationary storage in a sealed glass vessel at 60° C. for 6 months, the recording liquid was filtered under pressure through a Teflon filter having a pore size of 1$\mu$, and the presence of and the quantity of precipitates were examined. The standards for evaluation are as follows.

—: no precipitate formed
+: a little precipitate observed on the filter
++: precipitate formed on the filter
+++: precipitate deposited in a glass vessel

[Ink jet recording test]

The recording liquid was fed into a recording device having an on-demand type ink jet recording head which discharges the recording liquid by a piezo-oscillator (discharging orifice diameter: 50$\mu$, voltage for driving piezo-oscillator: 80 V, frequency: 3 KHz), and after left to stand in an atmosphere of 20° C. and about 60% RH for one month and 4 months, letter printing test was conducted for about 10 minutes. The standards for evaluation are as follows:

o: letter printing was satisfactory
x: discharging of ink was sometimes interrupted
xx: ink could not be discharged

EXAMPLES 2-7

By using the dyes of No. 8, No. 20, No. 15, No. 14, No. 2 and No. 7 prepared according to the method of Synthesis example 1, the recording liquids having the compositions shown below, respectively, were prepared according to the same procedure as in Example 1.

| Composition II (Example 2) | |
|---|---|
| Water | 62 parts by weight |
| N—methyl-2-pyrrolidone | 15 parts by weight |
| Diethylene glycol | 20 parts by weight |
| Dye No. 8 | 3 parts by weight |
| Composition III (Example 3) | |
| Water | 45 parts by weight |
| Ethylene glycol | 20 parts by weight |
| 1,3-dimethyl-2-imidazolidinone | 31 parts by weight |
| Dye No. 20 | 4 parts by weight |
| Composition IV (Example 4) | |
| Water | 60 parts by weight |
| Diethylene glycol | 36 parts by weight |
| Dye No. 15 | 4 parts by weight |
| Composition V (Example 5) | |
| Water | 72 parts by weight |
| Diethylene glycol | 24 parts by weight |
| Dye No. 14 | 4 parts by weight |
| Composition VI (Example 6) | |
| Water | 46 parts by weight |

-continued

| | |
|---|---|
| Ethylene glycol | 20 parts by weight |
| N—methyl-2-phrrolidone | 30 parts by weight |
| Dye No. 2 | 4 parts by weight |
| Composition VII (Example 7) | |
| Water | 55 parts by weight |
| Diethylene glycol | 41 parts by weight |
| Dye No. 7 | 4 parts by weight |

Using these recording liquids, evaluation tests were conducted similarly as in Example 1. The results are shown in Table 1.

EXAMPLES 8–10

By using the dye of No. 21 prepared in Synthesis example 2 and the dyes of No. 27 and No. 23 prepared according to the similar methods, the recording liquids having the compositions shown below were prepared according to the same procedure as in Example 1.

| | |
|---|---|
| Composition VIII (Example 8) | |
| Water | 66 parts by weight |
| Diethylene glycol monomethyl ether | 30 parts by weight |
| Dye No. 21 | 4 parts by weight |
| Composition X (Example 9) | |
| Water | 70 parts by weight |
| Ethylene glycol monomethyl ether | 26 parts by weight |
| Dye No. 27 | 4 parts by weight |
| Composition X (Example 10) | |
| Water | 60 parts by weight |
| N—methyl-2-pyrrolidone | 16 parts by weight |
| Ethylene glycol dimethyl ether | 20 parts by weight |
| Dye No. 23 | 4 parts by weight |

Also for these recording liquids, the same evaluation tests were conducted as in Example 1. The results are shown in Table 1.

EXAMPLES 11–30

The recording liquids were prepared by using one of the 20 dyes mentioned above as the specific embodiments in place of the dyes in Examples 1–10 according to Table 1 and in the similar procedure to Example 1.

Also for these recording liquids, the same evaluation tests were conducted as in Example 1. The results are shown in Table 1.

CONPARATIVE EXAMPLES 1 AND 2

In the Composition I of Example 1, in place of Dye No. 1, sodium salt of copper phthalocyanine tetrasulfonic acid was used to prepare a recording liquid according to the same procedure as in Example 1; similarly Dye No. 27 in the composition of Example 9 was replaced with sodium salt of copper phthalocyanine disulfonic acid to prepare a recording liquid. Also for these recording liquids, the same evaluation tests were conducted as in Example 1. The results are shown in Table 1.

TABLE 1

| Example | Dye | Composition | Solution stability test | Ink jet recording test After one month | After four months |
|---|---|---|---|---|---|
| Example 1 | 1 | I | — | o | o |
| Example 2 | 8 | II | — | o | o |
| Example 3 | 20 | III | — | o | o |
| Example 4 | 15 | IV | — | o | o |
| Example 5 | 14 | V | — | o | x |
| Example 6 | 2 | VI | — | o | o |
| Example 7 | 7 | VII | — | o | o |
| Example 8 | 21 | VIII | — | o | o |
| Example 9 | 27 | IX | — | o | o |
| Example 10 | 23 | X | — | o | o |
| Example 11 | 3 | X | — | o | o |
| Example 12 | 25 | X | — | o | o |
| Example 13 | 26 | X | — | o | o |
| Example 14 | 29 | X | — | o | x |
| Example 15 | 30 | X | — | o | o |
| Example 16 | 4 | VI | — | o | o |
| Example 17 | 5 | VI | — | o | o |
| Example 18 | 6 | VI | — | o | x |
| Example 19 | 9 | VI | — | o | o |
| Example 20 | 10 | VI | — | o | o |
| Example 21 | 11 | VI | — | o | o |
| Example 22 | 12 | VI | — | o | o |
| Example 23 | 13 | VI | — | o | o |
| Example 24 | 16 | VII | — | o | o |
| Example 25 | 24 | VII | — | o | o |
| Example 26 | 17 | V | — | o | o |
| Example 27 | 18 | V | — | o | x |
| Example 28 | 19 | V | — | o | o |
| Example 29 | 28 | V | — | o | o |
| Example 30 | 27 | V | — | o | o |
| Comparative example 1 | *1 | I | +++ | xx | xx |
| Comparative example 2 | *2 | IX | +++ | x | xx |

*1: Sodium salt of copper phthalocyanine tetrasulfonic acid
*2: Sodium salt of copper phthalocyanine disulfonic acid

We claim:
1. A recording liquid comprising a recording agent, water and a water-soluble organic solvent as essential components, wherein said recording agent comprises at least one of the dyes represented by the formula (A) shown below:

(A)

wherein (Ph) represents a phthalocyanine skeleton at the center of which a metal atom may be coordinated, X represents an alkali metal or $NH_4$, a and b each independently represent an integer of 1 to 3 satisfying the relation of $2 \leq a+b \leq 4$, Q represents a group $-SO_2OR_1$ or a group $-SO_2NR_2R_3$, where $R_1$ represents an alkyl or an alicyclic group having not more than 15 carbon atoms which may be branched or an aralkyl group having not more than 15 carbon atoms, $R_2$ and $R_3$ each independently represent a group $-CH_2CH_2O)_nR_4$, a group $-CH_2CHOH)_nR_4$, a group

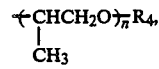

an alkyl or alicyclic group having not more than 15 carbon atoms which may be branched, or an amino acid salt radical, n is an integer of 0 to 12, and $R_4$ is H, $CH_3$ or $CH_2OH$.

2. A recording liquid according to claim 1, wherein the phthalocyanine skeleton of the dye is a phthalocyanine.

3. A recording liquid according to claim 1, wherein the phthalocyanine skeleton of the dye is a phthalocyanine comprising at its center a coordinated metal selected from the group consisting of copper, iron, cobalt, nickel, magnesium, tin, and manganese.

4. A recording liquid according to claim 1, wherein the group X in the dye is selected from the group consisting of sodium, potassium, lithium, and ammonium.

5. A recording liquid according to claim 1, wherein the integers a and b in the dye satisfy the relation of $3 \leq a+b \leq 4$.

6. A recording liquid according to claim 1, wherein the integers a and b in the dye satisfy the relation of $a+b=4$.

7. A recording liquid according to claim 1, wherein $R_1$ in the group $-SO_2OR_1$ of the dye is a radical having not more than 12 carbon atoms selected from the group consisting of unbranched alkyl, branched alkyl, alicyclic group, and aralkyl.

8. A recording liquid according to claim 1, wherein $R_2$ in the group $-SO_2NR_2R_3$ of the dye is a radical selected from the group consisting of a group $-CH_2CH_2O)_nR_4$, a group $-CH_2CHOH)_nR_4$, a group

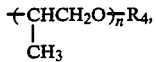

an alkyl or an alicyclic group having not more than 12 carbon atoms which may be branched, an aralkyl group having not more than 12 carbon atoms, and an amino acid salt radial.

9. A recording liquid according to claim 1, wherein $R_3$ in the group $-SO_2NR_2R_3$ of the dye is a radical selected from the group consisting of a group $-CH_2CH_2O)_nR_4$, a group $-CH_2CHOH)_nR_4$, a group

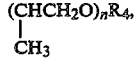

an alkyl or an alicyclic group having not more than 12 carbon atoms which may be branched, an aralkyl group having not more than 12 carbon atoms, and an amino acid salt radical.

10. A recording liquid according to claim 1, wherein the amino acid is selected from the group consisting of valine, alanine, serine, cysteine aspartic acid, glutamic acid, lysine, γ-aminobutyric acid, phenylalanine, histidine, and proline.

11. A recording liquid according to claim 1, wherein the dye is contained in an amount of from 0.5 to 20% by weight based on the total weight of the recording liquid.

12. A recording liquid according to claim 1, wherein the dye is contained in an amount of from 0.5 to 15% by weight based on the total weight of the recording liquid.

13. A recording liquid according to claim 1, wherein the dye is contained in an amount of from 1 to 10% by weight based on the total weight of the recording liquid.

14. A recording liquid according to claim 1, wherein water is contained in an amount of from 10 to 90% by weight based on the total weight of the recording liquid.

15. A recording liquid according to claim 1, wherein water is contained in an amount of from 10 to 70% by weight based on the total weight of the recording liquid.

16. A recording liquid according to claim 1, wherein said water-soluble organic solvent is contained in an amount of from 5 to 95% by weight based on the total weight of the recording liquid.

17. A recording liquid according to claim 1, wherein said water-soluble organic solvent is contained in an amount of from 10 to 80% by weight based on the total weight of the recording liquid.

18. A recording liquid according to claim 1, wherein said water-soluble organic solvent is contained in an amount of from 20 to 50% by weight based on the total weight of the recording liquid.

19. A recording liquid according to claim 1, wherein said water-soluble organic solvent is selected from the group consisting of polyhydric alcohols, lower alkyl ethers of polyhydric alcohols, and nitrogen-containing heterocyclic ketones.

20. A recording liquid according to claim 1, wherein said water-soluble organic solvent is selected from the group consisting of a group consisting of diethylene glycol, diethylene glycol monomethyl ether, diethylene glycol monoethyl ether, and N-methyl-2-pyrrolidone.

* * * * *